United States Patent [19]

Aihara

[11] Patent Number: 5,323,998
[45] Date of Patent: Jun. 28, 1994

[54] SEAT SLIDER MECHANISM

[75] Inventor: Tsutomu Aihara, Yokohama, Japan

[73] Assignee: Ohi Seisakusho Co., Ltd., Yokohama, Japan

[21] Appl. No.: 820,336

[22] Filed: Jan. 14, 1992

[30] Foreign Application Priority Data

Jan. 29, 1991 [JP] Japan ..................... 3-009196

[51] Int. Cl.⁵ ............................................. B60N 2/00
[52] U.S. Cl. ........................... 248/430; 248/188.9; 248/419
[58] Field of Search .............. 248/429, 419, 420, 393, 248/424, 430, 188.9; 297/346, 322, 329, 344; 296/65.1; 384/47, 50; 403/337, 408, 260, 241

[56] References Cited

U.S. PATENT DOCUMENTS

| 763,306 | 6/1904 | Miller | 248/188.9 |
| 3,930,632 | 1/1976 | Shigeta et al. | 248/429 |
| 4,364,536 | 12/1982 | Kluting | 248/429 |
| 4,506,747 | 3/1985 | Wykhuis | 403/337 |
| 4,556,186 | 12/1985 | Langmesser, Jr. et al. | 248/429 |
| 4,809,939 | 3/1989 | Matsushima et al. | 248/430 |
| 4,821,989 | 4/1989 | Munakata et al. | 248/430 |
| 4,863,289 | 9/1989 | Lecerf | 248/430 X |
| 4,940,285 | 7/1990 | Suzuki et al. | 248/430 X |
| 5,039,166 | 8/1991 | Kojho | 248/429 X |

FOREIGN PATENT DOCUMENTS

| 554873 | 7/1932 | Fed. Rep. of Germany | 248/188.9 |
| 3427467 | 2/1986 | Fed. Rep. of Germany | 248/430 |
| 0126228 | 7/1983 | Japan | 248/429 |
| 2193630 | 2/1988 | United Kingdom | 248/429 |

Primary Examiner—Karen J. Chotkowski
Attorney, Agent, or Firm—Foley & Lardner

[57] ABSTRACT

A seat slider mechanism consists of a U-shaped lower rail provided, on outer left and right sides, with a longitudinally oriented, downward facing first hook portion. An upper rail engages with the lower rail via a second, upward facing hook portion provided longitudinally on both left and right inner surfaces. A seat is mounted on the upper rail and a motor, or other source of driving force may be provided for moving the upper rail relative to the lower rail. The lower rail is secured by mounting brackets which are attached to end blocks by both rivets and welding.

33 Claims, 5 Drawing Sheets

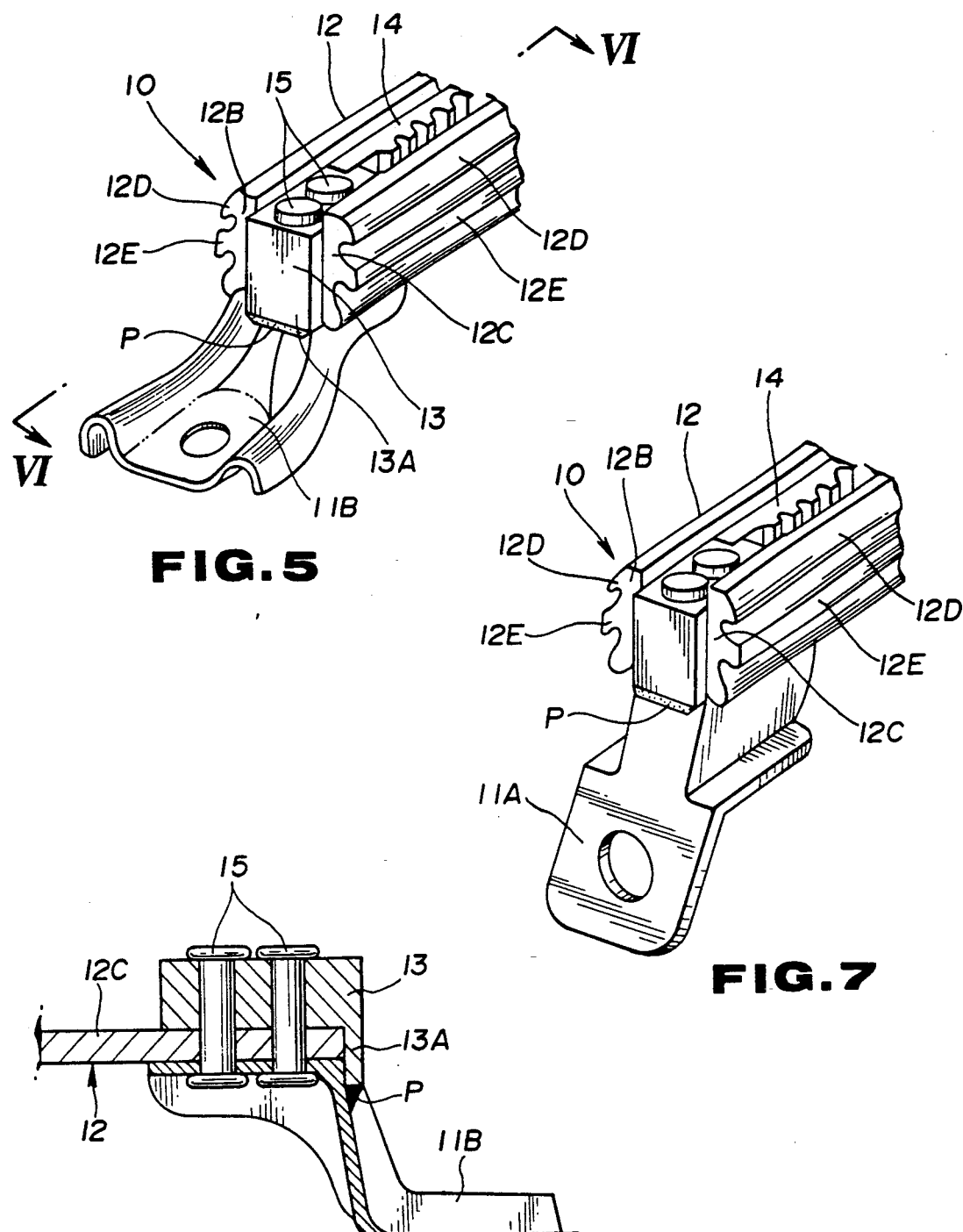

SEAT SLIDER MECHANISM

BACKGROUND OF THE INVENTION

1. Field of The Invention

The present invention relates generally to a seat slider mechanism, and, particularly to a power seat slider mechanism which can be implemented for automotive vehicle seats.

2. Description of The Background Art

The seat slider mechanism of the invention is particularly applicable to automotive vehicles, especially vehicles equipped with seat belts which affix to a rear portion of a seat, in a so-called belt-in arrangement, for restraining occupants during accident impact, sudden stopping, etc.

A power seat slider which utilizes a lower rail and rack construction is known in the art. This rack is engaged with a pinion gear and an upper rail is slidably supported on the lower rail. The pinion gear is held by the upper rail and associated with a motor via flexible cable to provide driving force for moving a seat mounted on the upper rail. In the above described power seat mechanism, a belt anchor is affixed to an upper rail for effecting a belt-in arrangement.

However, in the above arrangement, there is a danger of separation or bending of the upper and lower rails should collision, sudden stopping, or other sudden stress be applied to the seat structure. Therefore, in order to completely restrict vehicle occupants in the event of a collision, etc., mutually engaging steel guide members are welded to the upper and lower rails respectively, for slidably and reliably mounting the seat. However, with this arrangement, a seat mounting assembly becomes heavy and bulky, as well as complicated. Furthermore, manufacturing such a mounting involves high cost for both materials and labor.

SUMMARY OF THE INVENTION

It is therefore a principal object of the present invention to provide a seat slider mechanism which affords stability and reliability even under vehicle collision conditions and which may be simply manufactured.

It is a further object of the present invention to provide a seat slider mechanism which is compact in size as well as light in weight.

It is also an object of the invention to provide a seat slider mechanism which may be smoothly and easily operated.

In order to accomplish the aforementioned and other objects, a seat slider mechanism according to the present invention comprises: a lower rail, the lower rail being substantially U-shaped in cross section and including a downward facing first hook portion arranged longitudinally on right and left outer surfaces thereof and including a groove formed in a bottom inner surface thereof; an upper rail of a substantially inverted U shape, the upper rail including an upward facing second hook portion arranged longitudinally on right and left inner surfaces thereof for engaging with the first hook portion for slidably disposing the upper rail on the lower rail; a roller rotatably mounted in the groove of the lower rail so as to contact a facing surface of the upper rail; sliding means interposed between the first and second hook portions; and, mounting means, associated with the upper rail, for mounting a seat thereon.

According to another aspect of the present invention, a power seat slider mechanism for an automotive vehicle is provided, comprising: a lower rail, the lower rail being substantially U-shaped in cross section and including a downward facing first hook portion arranged longitudinally on right and left outer surfaces thereof; an upper rail of a substantially inverted U shape, the upper rail including an upward facing second hook portion arranged longitudinally on right and left inner surfaces thereof for engaging with the first hook portion for slidably disposing the upper rail on the lower rail; mounting means, associated with the upper rail, for mounting a seat thereon; a rack, disposed in the lower rail and associated with a pinion attached to the upper rail for controlling a relative position of the upper rail relative the lower rail; driving means, associated with the pinion, for moving the upper rail relative the lower rail; and means for securing the lower rail.

Also, according to a still further aspect of the present invention a mounting arrangement is disclosed comprising: end blocks set at opposite ends of a member to be mounted, the end blocks being associated with brackets attachable to a surface on which the member is to be mounted; a bottom surface of the member being secured between a bottom of the end blocks and an upper surface of the brackets by rivets; the end blocks and the brackets further being joined by welding at outward portions thereof, relative the member to be mounted.

BRIEF DESCRIPTION OF THE DRAWINGS

In the drawings:

FIG. 5 is a perspective view of a mounting arrangement for securing a lower rail according to the present invention.

FIG. 6 is a cross-sectional side view of the mounting arrangement which is taken along the line VI—VI of FIG. 5.

FIG. 7 shows an alternative embodiment of a mounting arrangement for a lower rail according to the present invention.

DESCRIPTION OF THE PREFERRED EMBODIMENT

Figure 1:
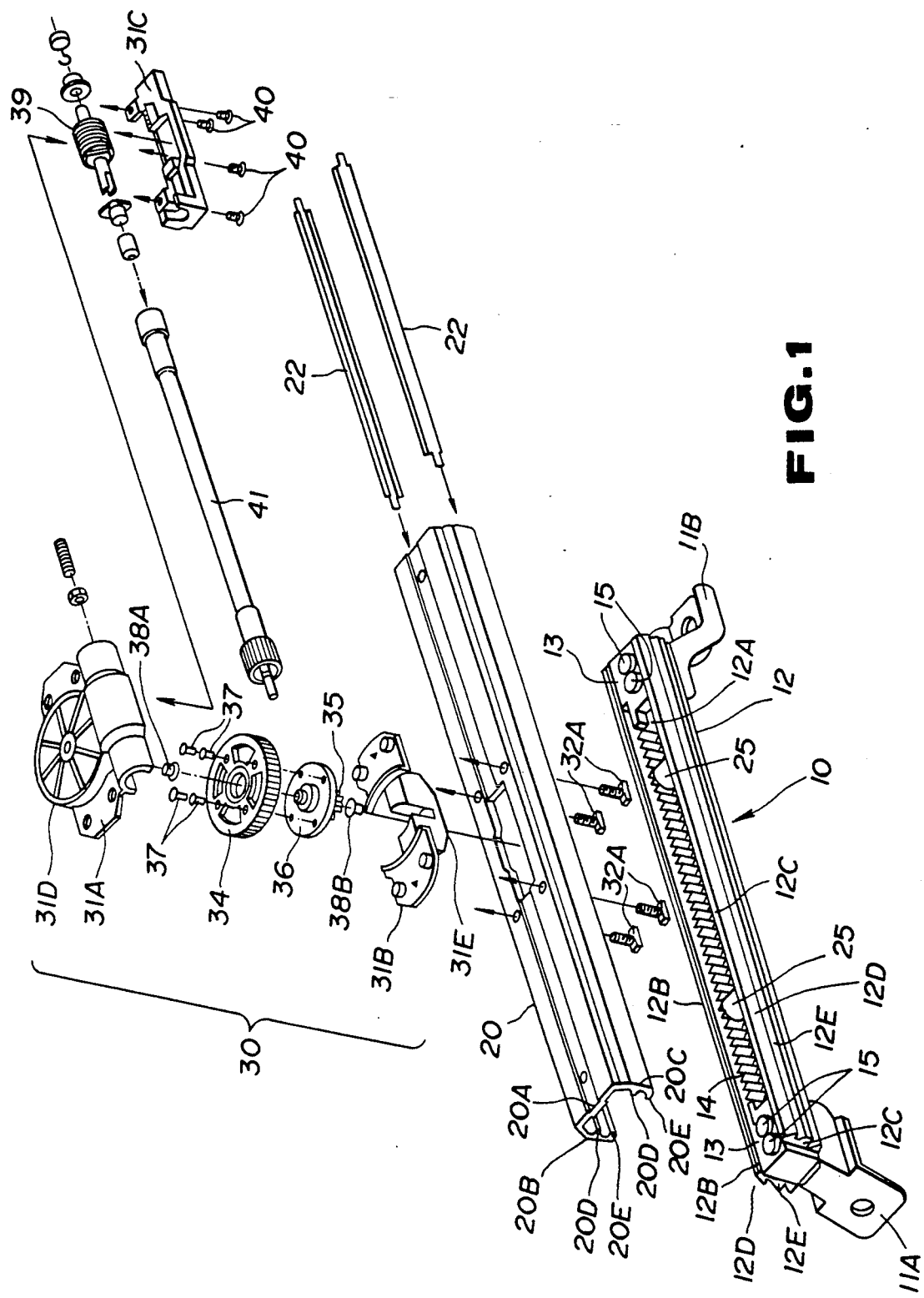
FIG. 1 is an exploded perspective view of a seat slider mechanism of a first embodiment according to the present invention.
Figure 3:
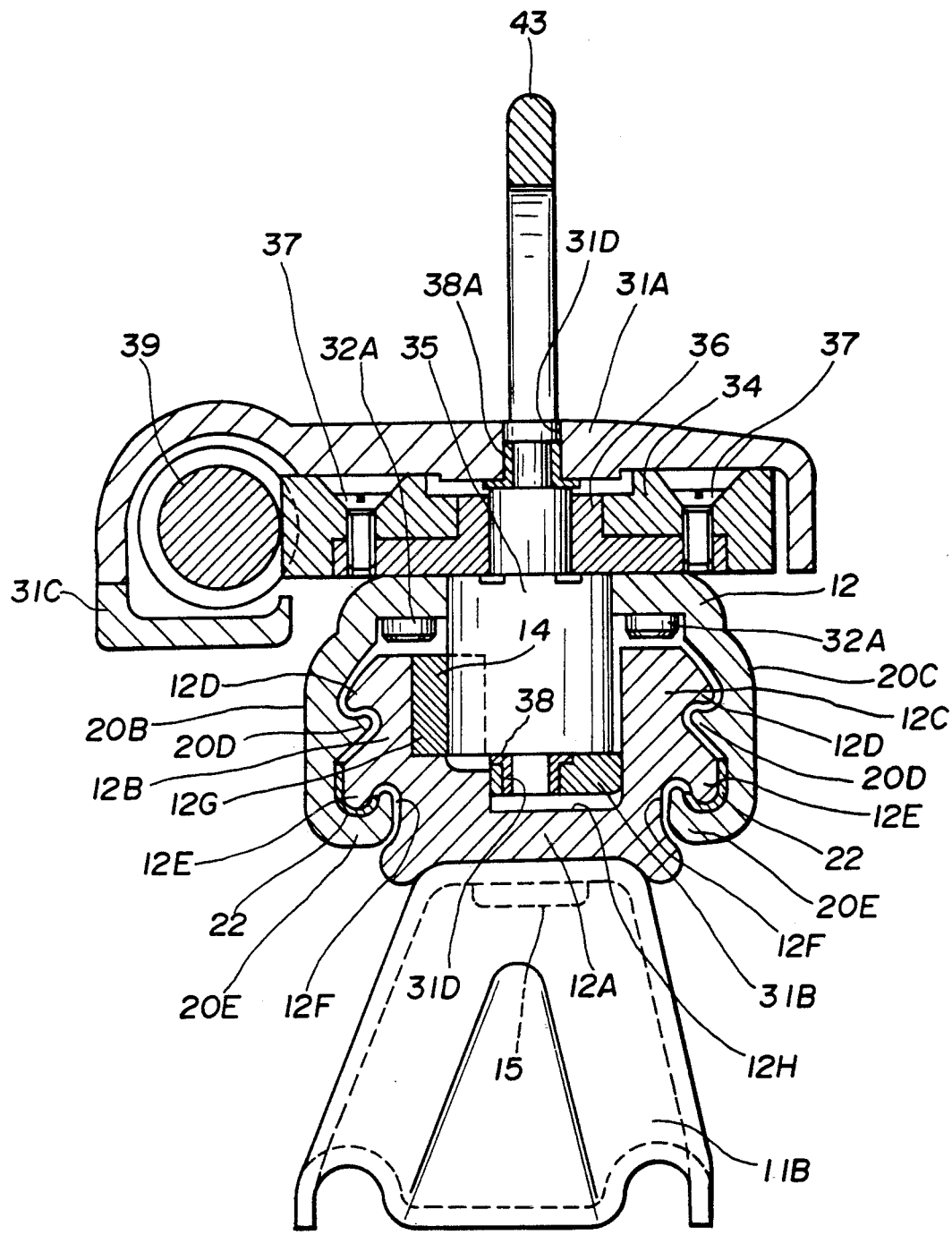
FIG. 3 is a cross-sectional view taken along line III—III of FIG. 2.

Referring now to the drawings, particularly to FIG. 1, a seat slider mechanism 10 according to the present invention comprises a lower rail 12 which is secured to the floor of an automotive vehicle (not shown), for example, by floor brackets 11a and 11b supported on end blocks 13. A base member 12A supports vertical side members 12B and 12C on both sides of the lower rail 12, the members 12A, 12B and 12C collectively define a substantially U-shaped cross-section of the lower rail 12. Longitudinally formed along the outer face of each of the side members 12B and 12C, are vertically spaced first hook portions 12D and 12E. The hook portions 12E are disposed below hook portions 12D on each of the side portions 12B and 12C respectively. The leading end of each of the hook portions 12D, 12D and 12E, 12E respectively are oriented in a downward direction, as may be seen clearly in FIG. 3. In addition, in the present embodiment, the lower hook portions 12E, 12E are formed larger than the upper hook portions 12D, 12D. Below the lower hook portions 12E, 12E, on each side of the lower rail 12 respectively, downwardly directed guide grooves 12F, 12F are formed, as can be seen in FIG. 3, the inner curvature of the lower hook portion 12E, 12E is contiguous with an upper curvature of the guide grooves 12F, 12F. Furthermore, the left side member 12B includes a step portion 12G for supporting the rack 14. Also, as seen in FIG. 1, above the base member 12A between the side members 12B and 12C rollers 25 are mounted. To allow free rotation of the rollers 25, a roller guide groove 12H, which is formed one step further down from the step portion 12G, is formed in the bottom member 12A.

Now, referring to FIGS. 5 and 6, at both ends of the lower rail 12, end blocks 13, 13 are provided. The end blocks 13, 13 facilitate securing of brackets 11A, 11A or 11B, 11B to the lower rail 12 via rivets 15 installed through respective ends of the lower rail. Further, at a downwardly extending portion 13A of each end block 13, the end blocks are respectively attached to the brackets 11A or 11B by welding, for example, thereby forming a joint P as shown in the drawings. Thus, the end blocks 13, 13 and the brackets 11A, 11A or 11B, 11B securely and stably hold the lower rail 12 and the rack 14 therebetween.

Brackets 11A, 11A are shown in FIG. 7 while the brackets 11B, 11B are shown in FIGS. 5 and 6.

Referring again to FIGS. 1 and 2, an upper rail 20 is shown. The upper rail 20 is preferably made of the same material as the lower rail 12, that is to say, aluminum alloy or other suitable material. The upper rail 20 fits atop the lower rail 12 and is of a substantially inverted U shape. The upper rail 20 includes top member 20A and side members 20B and 20C. On the side members 20B and 20C, vertically spaced at inner surfaces thereof respectively, longitudinally disposed second hook portions 20D, 20D and 20E, 20E are formed. The leading end of the hook portions 20D, 20D and 20E, 20E are oriented upwardly and respectively correspond to hook portions 12D, 12D and 12E, 12E for slidably engaging therewith.

Between hook portions 12E, 12E of the lower rail 12 and hook portions 20E, 20E of the upper rail, substantially U-shaped sliders 22 are interposed. The sliders 22 may be made of synthetic resin, for example, and serve to reduce friction and facilitate smooth operation of the slider mechanism 10. In addition, when the upper and lower rails are assembled together, the rollers 25 are interposed between the top member 20A and the bottom member 12A of the upper and lower rails respectively.

Figure 2:
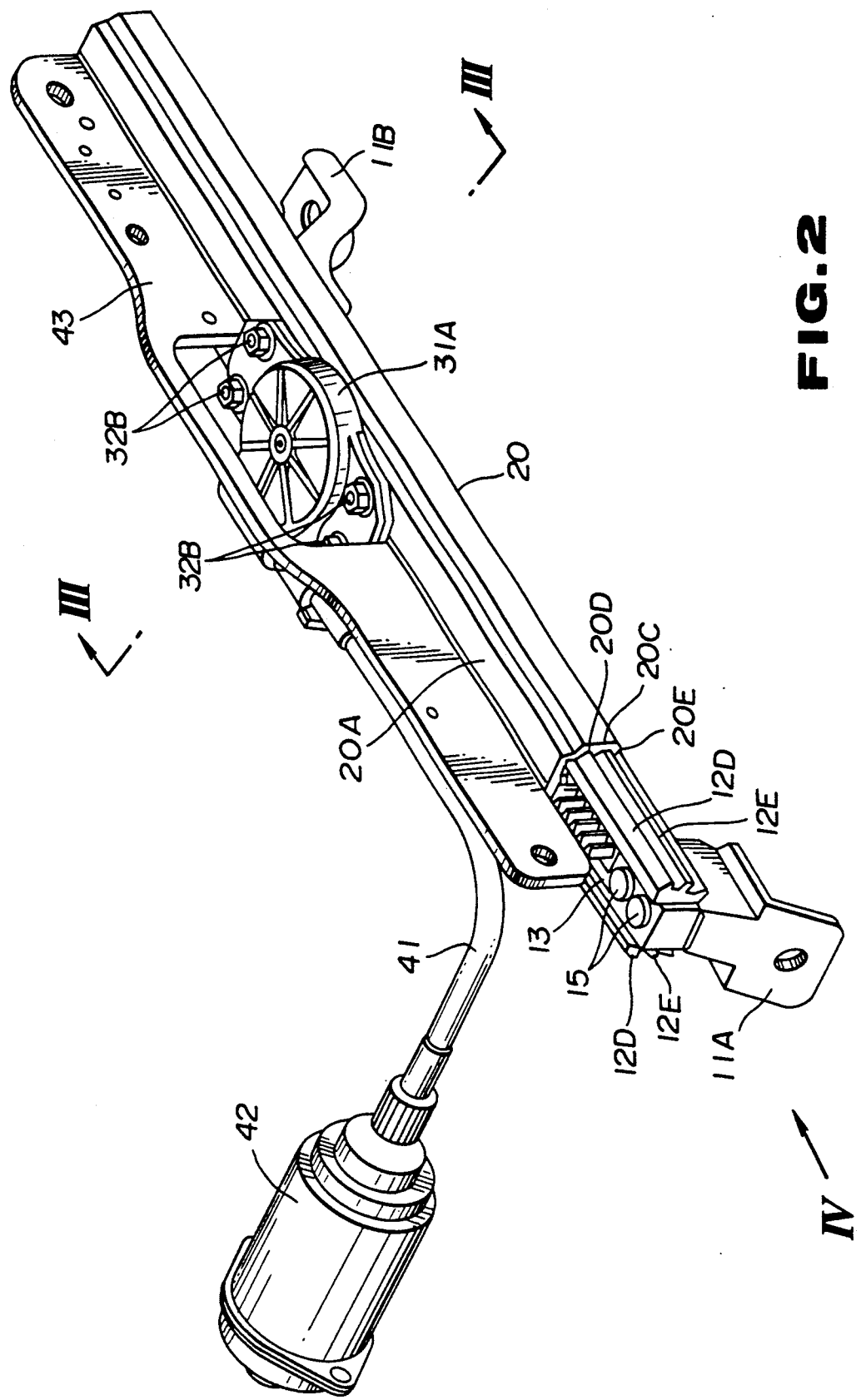
FIG. 2 is an assembled perspective view of the mechanism of FIG. 1 of a symmetrically opposite construction, also showing a motor acting as a driving power source.
Figure 4:
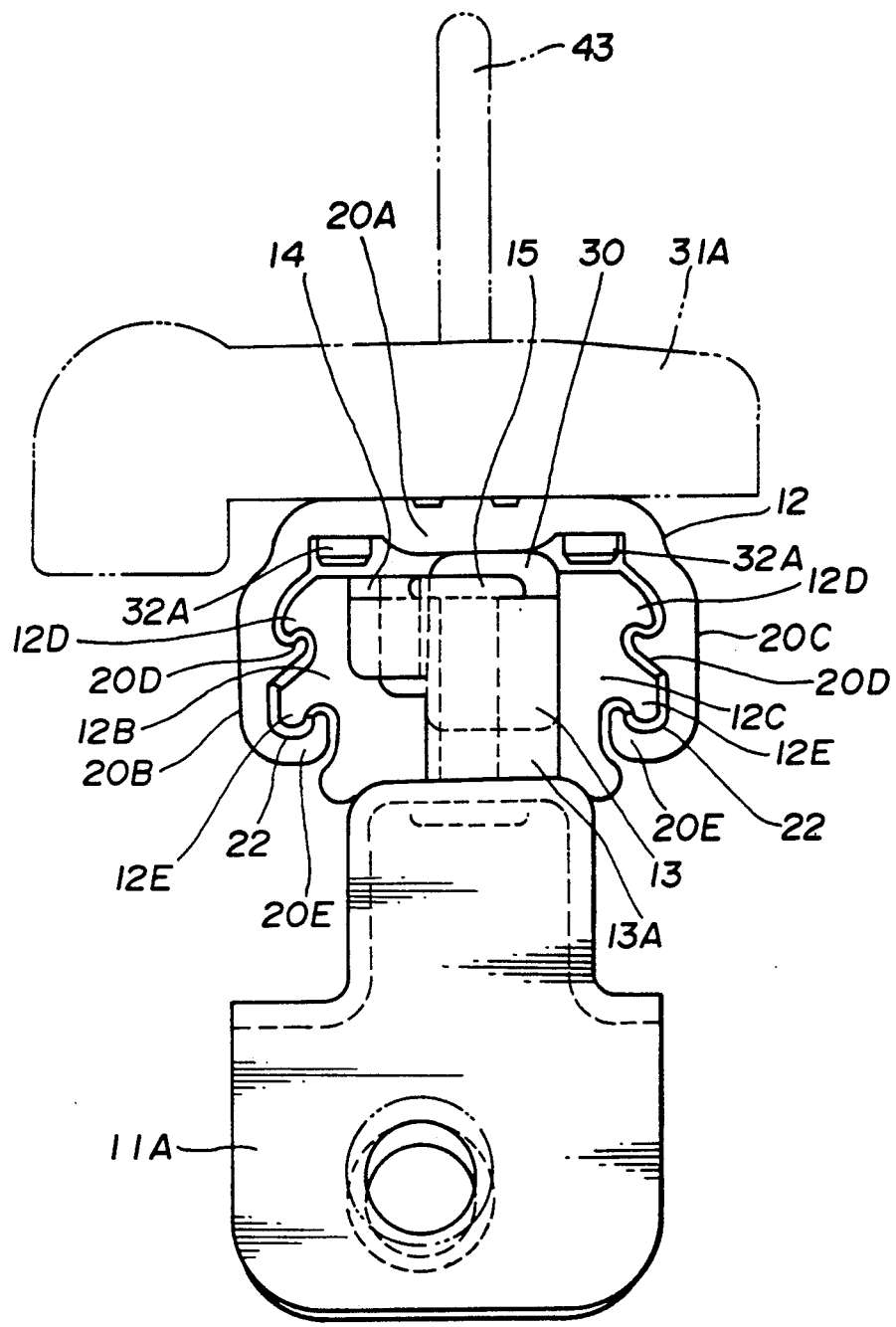
FIG. 4 is a schematic view of the cross-section of FIG. 3, showing engagement between upper and lower rails of the seat slider mechanism.

Next, a drive mechanism 30 according to the present invention will be explained hereinafter referring to FIGS. 1 and 4. The drive mechanism facilitates controlled movement of the upper rail in forward and rearward directions and comprises a casing 31 which is assembled generally in three sections, an upper casing 31A, a lower casing 31B and a gear mount 31C. The casing 31 is affixed to the upper rail 20 via bolts 32A with corresponding nuts 32B (FIG. 2). Within the drive mechanism 30 is a worm wheel 34 associated with a pinion gear assembly 36 including a pinion gear 35 which engages with the rack 14 disposed in the lower rail 12. In the present embodiment the worm wheel 34 is attached to the pinion gear assembly 36 by means of bolts 37 although, alternatively, the worm wheel 34 and pinion gear assembly 36 may be formed integrally. Together the worm wheel 34 and pinion gear assembly 36 are rotatably mounted between the upper casing 31A and lower casing 31B by means of upper and lower bushings 38A and 38B. The bushings 38A, 38B are retained in mounting holes 31D and 31E in the upper and lower casings 31A, 31B respectively.

The gear mount 31C of the drive mechanism casing 31 rotatably supports a worm gear 39 therein. The worm gear 39 engages with the worm wheel 34 for turning the pinion gear 35. In the present embodiment the gear mount 31C is joined to the upper casing 31A by means of bolts 40. The worm gear 39 is engaged with a flexible cable 41 which transmits driving force in both forward and reversed directions to the worm gear 39 from a motor 42.

Affixed to the upper surface of the upper rail 20, a seat mount 43 is provided for mounting a vehicle seat (not shown) thereon. It will be noted that the mounting plate 43 also acts as an anchor bracket which may be utilized for securing one end of a seat belt.

It will be noted that the seat slider mechanism of the present invention may be implemented by providing two symmetrically opposite mechanisms for each seat. That is to say, an upper plate 43 of two slider mechanisms as described above, may be affixed to each side of a single seat. In this case, two motors 42 may be provided to operate in synchronism for surely and smoothly changing the seat position, though, alternatively, both mechanisms may be powered by a common motor. It will be noted that FIG. 2 shows a slider mechanism which is symmetrically opposite that of FIG. 1, for supporting a seat at left and right sides.

Thus, according to the present invention, rotational force of the motor 42 may be transferred via the flexible cable 41 to turn the worm gear 39, in turn engaged with the worm wheel 34 and pinion gear assembly 36 for causing the pinion gear 35 to turn while engaged with the rack 14 of the lower rail for changing the position of the upper rail 20 relative the lower rail 12.

In addition, it will be noted that, when no power is applied to the motor 42, the engagement of the worm wheel 34 and the worm gear 39 effectively prevents rotation of the pinion gear 35, thus acting as a lock mechanism which can stably retain the seat position against the weight of a seat occupant.

Furthermore, as applied to a vehicle, in the event of a vehicular collision, the seat slider mechanism according to the above described construction may effectively withstand even high impact loads to firmly hold the seat in position. That is to say, during collision, the seat mounting plate 43 is subjected to substantially high impact load. According to the construction of the present invention, the hook portions 12D, 12D and 12E, 12E of the lower rail 12 which are engaged with the hook portions 20D, 20D and 20E, 20E of the upper rail 20 interlock at four positions to allow the upper and lower rail to resist impact essentially as if they were a single body. This construction, coupled with the breaking strength of the aluminum alloy, is sufficient to prevent breakage or dislodgment or separation of the upper and lower rails of the slider mechanism during a vehicle impact. In addition, the arrangement of the hook portions of the upper and lower rails 12 and 20 resists impact load applied laterally in left or right directions. The above advantages are achieved with a simple and compact arrangement.

As for the brackets 11A and 11B which, in conjunction with the end blocks 13, secure the slider mechanism to a vehicle floor, for example, the structure as disclosed hereinabove provides a stable mounting arrangement which can suitably resist shocks applied thereto by collision, etc. That is, the brackets 11A and 11B are joined to their respective end blocks 13 by a welded portion P and the bottom rail 12 is supported between the brackets 11 and the end blocks 13, held by rivets. Since a load applied to the seat structure is dispersed between the rivets and the welded portions P, a tendency toward guttering by the rivets is reduced. Further, stress applied to the lower rail 12 is dispersed over the relatively large area between the brackets 11 and seat stability is maintained. Also, as mentioned above, since load applied to the structure is dispersed between the rivets and the welded portion P, under vehicle impact conditions, the rivets are prevented from 'popping' due to the applied load, thereby assuring passenger safety.

In addition, in an arrangement wherein two slider mechanisms are used to support a single seat, reliable seat positioning may be achieved using only a single rack 14.

Finally, since rollers 25 are suspended within the guide groove 12H of the lower rail 12, and sliders 22 are positioned between the upper rail 20 and the lower rail 12, smooth sliding and ease of use are obtained.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A seat slider mechanism comprising:
   a lower rail, said lower rail being substantially U-shaped in cross section and including a downward facing first hook portion arranged longitudinally on right and left outer surfaces thereof and including a groove formed in a bottom inner surface thereof;
   an upper rail of a substantially inverted U shape, said upper rail including an upward facing second hook portion arranged longitudinally on right and left inner surfaces thereof for engaging with said first hook portion for slidably disposing said upper rail on said lower rail, said first hook portion comprising longitudinally oriented upper and lower hook members running parallel along said left and right outer surfaces of said lower rail, said second hook portion comprising longitudinally oriented upper and lower hook members running parallel along said left and right inner surfaces of said upper rail;
   a roller rotatably mounted in said groove of said lower rail so as to contact a facing surface of said upper rail;
   sliding means interposed between said first and second hook portions; and
   mounting means, associated with said upper rail, for mounting a seat thereon.

2. A seat slider mechanism as set forth in claim 1, wherein said sliding means is interposed between said lower hook member of said lower rail and said lower hook member of said upper rail.

3. A seat slider mechanism as set forth in claim 1, wherein said lower hook members of said first and second hook portions are formed larger than said upper hook members.

4. A seat slider mechanism as set forth in claim 1, wherein said mounting means comprises a vertically disposed plate attached to said upper rail.

5. A seat slider mechanism as set forth in claim 4, wherein said mounting means further includes means for attaching a seat belt anchor thereto.

6. A seat slider mechanism as set forth in claim 1, further including a rack disposed in said lower rail and a pinion attached to said upper rail, said rack engaging said pinion for controlling a relative position of said upper rail relative to said lower rail.

7. A seat slider mechanism as set forth in claim 6, further comprising driving means, associated with said pinion, for moving said upper rail relative to said lower rail.

8. A seat slider mechanism as set forth in claim 7, further comprising a flexible cable for associating said pinion with said driving means.

9. A seat slider mechanism as set forth in claim 7, wherein said driving means is an electric motor.

10. A seat slider mechanism as set forth in claim 1, wherein a plurality of said mechanisms are utilized for mounting a single seat.

11. A seat slider mechanism as set forth in claim 10, wherein a single rack and pinion arrangement is used for controlling a relative position of said upper rail relative to said lower rail.

12. A seat slider mechanism as set forth in claim 10, wherein driving means are respectively provided for each of said plurality of mechanisms.

13. A seat slider mechanism as set forth in claim 1, further including means for securing said lower rail and wherein said means for securing said lower rail comprises end blocks set in opposite ends of said lower rail and brackets associated with said end blocks, said brackets being attachable to a surface on which the slider mechanism is to be mounted.

14. A seat slider mechanism as set forth in claim 13, wherein a bottom surface of said lower rail is secured between a bottom of said end blocks and an upper surface of said brackets by rivets.

15. A seat slider mechanism as set forth in claim 14, wherein said end blocks and said brackets are joined by welding at portions outward thereof, relative to said lower rail.

16. A seat slider mechanism as set forth in claim 1, further including means for securing said lower rail.

17. A seat slider mechanism as set forth in claim 13, wherein said end blocks are formed of steel.

18. A power seat slider mechanism for an automotive vehicle, comprising:
   a lower rail, said lower rail being substantially U-shaped in cross section and including a downward facing first hook portion arranged longitudinally on right and left outer surfaces thereof;
   an upper rail of a substantially inverted U shape, said upper rail including an upward facing second hook portion arranged longitudinally on right and left inner surfaces thereof for engaging with said first hook portion for slidably disposing said upper rail on said lower rail, said first hook portion comprising longitudinally oriented upper and lower hook members running parallel along said left and right outer surfaces of said lower rail, said second hook portion comprising longitudinally oriented upper and lower hook members running parallel along said left and right inner surfaces of said upper rail;

mounting means, associated with said upper rail, for mounting a seat thereon;

a rack, disposed in said lower rail and a pinion attached to said upper rail, said rack engaging said pinion for controlling a relative position of said upper rail relative to said lower rail;

driving means, associated with said pinion, for moving said upper rail relative to said lower rail; and means for securing said lower rail.

19. A power seat slider mechanism as set forth in claim 18, further comprising sliding means interposed between said lower hook member of said lower rail and said lower hook member of said upper rail.

20. A power seat slider mechanism as set forth in claim 18, wherein a mass and degree of protrusion of said lower hook members of said first and second hook portions is greater than that of said upper hook members.

21. A power seat slider mechanism as set forth in claim 18, wherein said mounting means comprises a vertically disposed plate attached to said upper rail, said mounting means further including means for attaching a seat belt anchor thereto.

22. A power seat slider mechanism as set forth in claim 18, wherein a groove is provided in said lower rail and a roller is rotatably mounted in said groove so as to contact a facing surface of said upper rail.

23. A power seat slider mechanism as set forth in claim 18, wherein a plurality of said mechanisms are utilized for mounting a single seat.

24. A power seat slider mechanism as set forth in claim 23, wherein a single rack, pinion and driving means arrangement is used for controlling a relative position of said upper rail relative to said lower rail.

25. A power seat slider mechanism as set forth in claim 23, wherein driving means are respectively provided for each of said plurality of mechanisms.

26. A power seat slider mechanism as set forth in claim 24, wherein said driving means is an electric motor.

27. A power seat slider mechanism as set forth in claim 18, wherein said means for securing said lower rail comprises end blocks set in opposite ends of said lower rail and brackets associated with said end blocks, said brackets being attachable to a surface of which the slider mechanism is to be mounted.

28. A power seat slider mechanism as set forth in claim 27, wherein a bottom surface of said lower rail is secured between a bottom of said end blocks and an upper surface of said brackets by rivets.

29. A power seat slider mechanism as set forth in claim 28, wherein said end blocks and said brackets are joined by welding at portions outward thereof, relative to said lower rail.

30. A power seat slider mechanism as set forth in claim 27, wherein said end blocks are formed of steel.

31. A power seat slider mechanism as set forth in claim 18, further comprising a flexible cable for associating said pinion with said driving means.

32. A power seat slider mechanism as set forth in claim 18, further comprising a sliding means interposed between said first and second hook portions.

33. A power seat slider mechanism as set forth in claim 18, wherein said upper and lower rails are respectively made of aluminum alloy.

* * * * *